(12) United States Patent
Puffer et al.

(10) Patent No.: US 12,236,408 B1
(45) Date of Patent: Feb. 25, 2025

(54) SYSTEMS AND METHODS FOR NEAR-FIELD COMMUNICATION TOKEN ACTIVATION

(71) Applicant: Wells Fargo Bank, N.A., San Francisco, CA (US)

(72) Inventors: Steven E. Puffer, Champlin, MN (US); Jerome Rhodes, Hayward, CA (US); Michael R. Thomas, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 175 days.

(21) Appl. No.: 17/564,343

(22) Filed: Dec. 29, 2021

Related U.S. Application Data

(62) Division of application No. 16/021,766, filed on Jun. 28, 2018, now Pat. No. 11,244,297.

(60) Provisional application No. 62/527,148, filed on Jun. 30, 2017.

(51) Int. Cl.
| | |
|---|---|
| *G06Q 20/10* | (2012.01) |
| *G06Q 20/32* | (2012.01) |
| *G06Q 20/36* | (2012.01) |
| *G06Q 20/40* | (2012.01) |

(52) U.S. Cl.
CPC ..... *G06Q 20/1085* (2013.01); *G06Q 20/3226* (2013.01); *G06Q 20/3278* (2013.01); *G06Q 20/3672* (2013.01); *G06Q 20/4012* (2013.01)

(58) Field of Classification Search
CPC ........... G06Q 20/1085; G06Q 20/3226; G06Q 20/3278; G06Q 20/3672; G06Q 20/4012

USPC .......................................................... 705/43
See application file for complete search history.

(56) References Cited

U.S. PATENT DOCUMENTS

| | | | |
|---|---|---|---|
| 9,092,776 | B2 | 7/2015 | Dessert |
| 10,535,047 | B1 * | 1/2020 | Thomas ................ G06Q 20/326 |
| 10,706,400 | B1 * | 7/2020 | Puffer .............. G06Q 20/38215 |
| 2007/0262134 | A1 | 11/2007 | Humphrey et al. |
| 2014/0019352 | A1 | 1/2014 | Shrivastava |
| 2014/0263627 | A1 | 9/2014 | Wyatt |

(Continued)

OTHER PUBLICATIONS

Cowley, "Banks shift from plastic to phone at ATMs", The Register, Feb. 2017. (Year: 2017).

(Continued)

*Primary Examiner* — Lindsay M Maguire
(74) *Attorney, Agent, or Firm* — Foley & Lardner LLP

(57) ABSTRACT

A mobile device includes a near-field communication (NFC) device, a network interface, an input/output device, and a processing circuit having a processor and a memory. The memory stores instructions that, when executed by the processor, cause the processing circuit to receive, via the input/output device, payment card information relating to a payment card of a customer and to transmit, via the network interface, the payment card information to a mobile wallet computing system. The instructions further cause the processing circuit to receive, via the network interface, an inactive payment token representing the payment card and to store the inactive payment token in a mobile wallet of the mobile device. The instructions further cause the processing circuit to establish, via the NFC device, an NFC session with an automated teller machine (ATM) and to update a status of the stored inactive payment token from inactive to active.

16 Claims, 7 Drawing Sheets

(56) References Cited

U.S. PATENT DOCUMENTS

| | | |
|---|---|---|
| 2014/0344153 A1 | 11/2014 | Raj et al. |
| 2015/0046339 A1 | 2/2015 | Wong et al. |
| 2015/0112862 A1 | 4/2015 | Kheradpir et al. |
| 2015/0254646 A1 | 9/2015 | Harkey et al. |
| 2015/0312038 A1 | 10/2015 | Palanisamy |
| 2016/0189142 A1 | 6/2016 | Chandru et al. |
| 2016/0253651 A1* | 9/2016 | Park ...................... G06Q 20/34 705/39 |
| 2017/0046687 A1* | 2/2017 | Stern .................. G06Q 20/3415 |
| 2017/0344990 A1 | 11/2017 | Kohli |
| 2018/0005493 A1* | 1/2018 | Basu ............... G06Q 20/35765 |
| 2018/0165663 A1 | 6/2018 | Naik et al. |
| 2019/0188975 A1* | 6/2019 | Basu ..................... G07F 19/203 |
| 2021/0217005 A1* | 7/2021 | Mehrhoff .......... G06Q 20/4014 |

OTHER PUBLICATIONS

Wells Fargo website, "Active and Use your Debit Card", 2014. (Year: 2014).

* cited by examiner

SYSTEMS AND METHODS FOR NEAR-FIELD COMMUNICATION TOKEN ACTIVATION

CROSS-REFERENCE TO RELATED APPLICATIONS

This application is a divisional application of U.S. patent application Ser. No. 16/021,766, titled "SYSTEMS AND METHODS FOR NEAR-FIELD COMMUNICATION TOKEN ACTIVATION," filed Jun. 28, 2018, which claims priority to U.S. Provisional Patent Application No. 62/527,148, titled "SYSTEMS AND METHODS FOR NEAR-FIELD COMMUNICATION TOKEN ACTIVATION," filed Jun. 30, 2017, each of which is incorporated herein by reference in its entirety.

TECHNICAL FIELD

Embodiments of the present disclosure relate generally to the field of mobile wallets.

BACKGROUND

Payments for products and services are often completed using credit cards, debit cards, checks, and/or cash. At the same time, most people carry some type of mobile device. Electronic-based transactions can be carried out using a mobile device. For example, mobile devices can be enabled to allow mobile device users to purchase goods and services through payment applications at point-of-sale terminals. Beneficially, using a mobile device to make payments at point-of-sale terminals alleviates or reduces the need for users to carry cash or payment cards (e.g., credit cards), which some users may find appealing.

SUMMARY

One embodiment relates to an automated teller machine ("ATM"). The ATM includes a near-field communication ("NFC") device, a network interface configured to communicate data via a network, a display device configured to present information to a customer, and an input/output device configured to exchange data with the customer. The ATM also includes a processing circuit including a processor and a memory, the memory structured to store instructions that are executable by the processor. The instructions cause the processing circuit to establish, by the NFC device, an NFC session with a mobile device of the customer, the mobile device having a mobile wallet, the mobile wallet including an inactive payment token representing a payment card held by the customer; receive, by the input/output device, at least one authentication credential relating to the payment card from the customer; verify, by the network interface, the at least one authentication credential; and activate, by at least one of the NFC device or the network interface, the inactive payment token.

Another embodiment relates to a method of activating an inactive payment token. The method includes establishing, by an ATM, an NFC session with a mobile device of a customer, the mobile device having a mobile wallet, the mobile wallet including an inactive payment token representing a payment card held by the customer, and receiving, by the ATM, at least one authentication credential relating to the payment card from the customer. The method further includes verifying, by the ATM, the at least one authentication credential and activating, by the ATM, the inactive payment token.

Another embodiment relates to a mobile device. The mobile device includes an NFC device, a network interface configured to communicate data via a network, a display device configured to present information to a customer, and an input/output device configured to exchange data with the customer. The mobile device also includes a processing circuit includes a processor and a memory, the memory structured to store instructions that are executable by the processor. The instructions cause the processing circuit to receive, by the input/output device, information relating to a payment card of the customer; transmit, by the network interface, the payment card information to a mobile wallet computing system; and receive, by the network interface, an inactive payment token representing the payment card and storing the inactive payment token in a mobile wallet on the mobile device. The instructions further cause the processing circuit to establish, by the NFC device, an NFC session with an ATM and update a status of the stored payment token from inactive to active.

DETAILED DESCRIPTION

Figure 1:
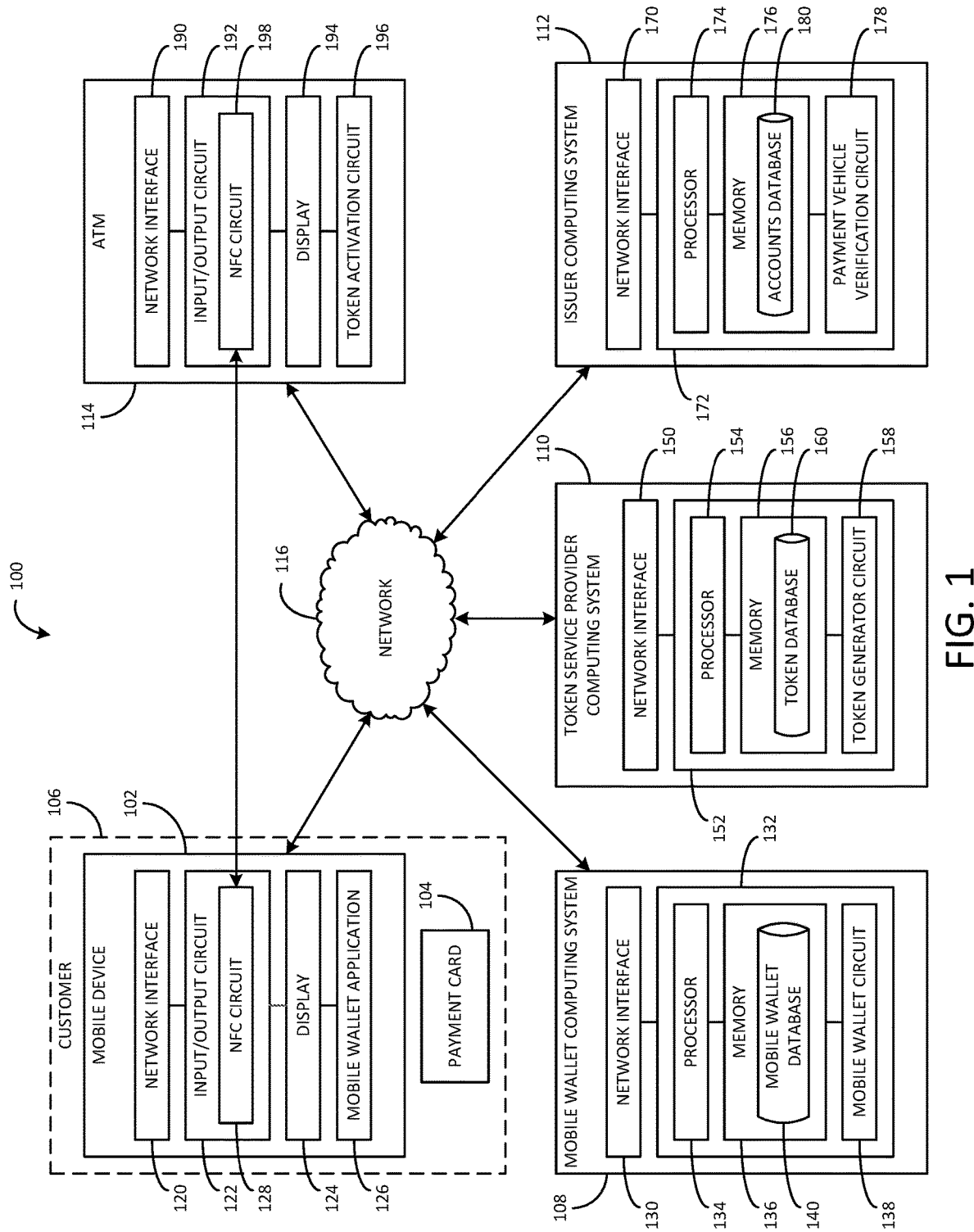
FIG. 1 is an environment view of a mobile wallet system, according to an example embodiment.

Referring to the Figures generally, various systems, methods, and apparatuses for providing a near-field token activation system are described herein. More particularly, systems and methods for using an ATM to activate a token on a mobile wallet are described herein.

An example embodiment is described as follows. A customer registers for a mobile wallet account with a mobile wallet provider and registers a payment card (e.g., a debit card, a credit card) to the customer's mobile wallet account. In response, an inactive payment token representing the payment card is provisioned to the customer's mobile wallet on the customer's mobile device, either by the mobile wallet provider or by a token service provider. The customer then takes the mobile device with the mobile wallet to an ATM, where the ATM activates the token using NFC. For example, the customer touches the mobile device to a location on the ATM, and the ATM communicates with the mobile device via NFC to activate the token. In some arrangements, the ATM prompts the customer to provide authentication information, such as a personal identification number (PIN) associated with the payment card, before the ATM activates the token. After the token has been activated, the customer can use the activated token to make purchases using the mobile wallet (e.g., by the mobile device transmitting the activated token in lieu of the payment card number to a merchant point-of-sale device to complete purchases).

The systems and methods described herein offer technical advantages for activating mobile wallet tokens. Traditionally, payment tokens included in a mobile wallet are activated by an issuer of financial accounts (e.g., an issuing financial institution) sending the customer an activation code (e.g., in a text message, in an email) for the customer to enter in the mobile wallet, sending the customer an activation link for the customer to click on, calling the customer to verify the customer's identity and/or payment card details, and so on. However, customers often forget to take or do not want to be inconvenienced by this additional activation step, and thus, many mobile wallet customers register payment cards to their mobile wallets without activating them. As such, when these customers attempt to use the registered payment card to make a purchase via the mobile wallet, the purchase is denied because the token is inactive. The systems and methods of NFC token activation described herein provide a simple and convenient method of token activation for mobile wallet customers. As an example, when a customer makes a cash withdrawal at an ATM, the ATM informs the customer that the customer's debit card has not yet been activated in the customer's mobile wallet. The customer is then able to activate the debit card at the ATM using NFC between the ATM and the customer's mobile device. This, in turn, also improves the functioning of the customer's mobile wallet on the mobile device, as the customer is less likely to attempt to unsuccessfully use the mobile wallet, perhaps even repeatedly, to make purchases with the inactive payment token if the customer is both reminded to activate the payment token and able to activate the payment token at the ATM. As such, the processors of the customer's mobile device are freed up to perform other actions on the mobile device.

Referring now to FIG. 1, an environmental view of an NFC token activation system 100 is shown, according to an example embodiment. As described in further detail below, the system 100 includes a mobile device 102 and a payment card 104 associated with a customer 106, a mobile wallet computing system 108, a token service provider computing system 110, an issuer computing system 112, and an ATM 114 connected by a secure network (e.g., network 116).

To begin with, the payment card 104 is a payment vehicle the customer 106 can use to initiate transaction payments from an account held by the customer 106 with an issuer, such as a debit card or a credit card. In some arrangements, the payment card 104 includes a primary account number ("PAN") that identifies the card network associated with the payment card 104, the issuer for the payment card 104 (e.g., the issuer associated with the issuer computing system 112), and the customer 106 account number associated with the payment card 104.

The mobile device 102 includes any type of mobile device operated by a customer in connection with services provided by a mobile wallet provider and/or an issuer of financial accounts. As such, the mobile device 102 includes, but is not limited to, a phone (e.g., a smartphone), a computing device (e.g., a tablet computer, a laptop computer, a personal digital assistant, etc.), a wearable device (e.g., a smart watch, smart glasses, a smart bracelet, etc.), and so on.

As shown in FIG. 1, the mobile device 102 includes a network interface 120, an input/output circuit 122, a display 124, and a mobile wallet application 126. The network interface 120 is used to establish connections via the network 116 between the mobile device 102 and other devices or computing systems in the system 100, such as the mobile wallet computing system 108, the token service provider computing system 110, and the issuer computing system 112. The network interface 120 further supports communication between the mobile device 102 and other devices or computing systems in the system 100.

The input/output circuit 122 is structured to receive communications from and provide communications to a user of the mobile device 102 (e.g., customer 106). In this regard, the input/output circuit 122 is structured to exchange data, communications, instructions, etc. with an input/output component of the mobile device 102. Accordingly, in one embodiment, the input/output circuit 122 includes an input/output device, such as a touchscreen, a keyboard, a microphone, or a speaker. In another embodiment, the input/output circuit 122 includes communication circuitry for facilitating the exchange of data, values, messages, and the like between an input/output device and the components of the mobile device 102. In yet another embodiment, the input/output circuit 122 includes machine-readable media for facilitating the exchange of information between the input/output device and the components of the mobile device 102. In still another embodiment, the input/output circuit 122 includes any combination of hardware components, communication circuitry, and machine-readable media.

As shown in FIG. 1, in various embodiments, the input/output circuit 122 includes an NFC circuit 128. The NFC circuit 128 is structured to enable the mobile device 102 to communicate with other devices using near-field communication protocols. In some arrangements, the NFC circuit 128 includes an NFC chip and an associated controller (e.g., collectively an "NFC device") that configures the chip to exchange information with other devices equipped for NFC communication. As illustrated in FIG. 1, the mobile device 102 is able to use the NFC circuit 128 to communicate with the ATM 114 directly (e.g., without connecting to the network 116).

In various embodiments, the display 124 is a screen, a touchscreen, etc. In some arrangements, the mobile device 102 uses the display 124 to communicate information to the user (e.g., customer 106), for example, by displaying information to the user on the display 124. In other arrangements, the mobile device 102 additionally uses the display 124 to receive communications from the user, for example, through a keyboard provided on a touchscreen of the display 124. Accordingly, in certain arrangements, the display 124 is incorporated as an input/output device associated with the input/output circuit 122 (e.g., a touchscreen of the display 124 is incorporated as an input/output device associated with the input/output circuit 122).

The mobile wallet application 126 is configured to interface with the mobile wallet computing system 108 to allow the customer 106 to use and manage the mobile wallet account of the customer 106. Accordingly, the mobile wallet application 126 is communicably coupled, via the network interface 120, to the mobile wallet computing system 108. However, as will be understood, the level of functionality that resides on the mobile device 102 versus the mobile wallet computing system 108 will vary depending on the implementation. For example, in some embodiments, the mobile wallet application 126 is a web-based application, and many of the functionalities are provided by the mobile wallet circuit 138 of the mobile wallet computing system 108.

Additionally, in various arrangements, the mobile wallet application 126 is communicably coupled, via the network interface 120, to the token service provider computing system 110 and/or the issuer computing system 112. For example, in one embodiment, the mobile wallet application 126 communicates with the token service provider computing system 110 and/or the issuer computing system 112 in registering a payment vehicle, such as payment card 104, to the customer's 106 mobile wallet. Moreover, in various arrangements, the mobile wallet application 126 is structured to communicate with other devices via the NFC circuit 128. As an example, and as described in further detail below, the mobile wallet application 126 is structured to permit the customer 106 to activate a token representing a payment vehicle, such as payment card 104, that has been provisioned to the customer's 106 mobile wallet but has not yet been activated via the NFC circuit 128. As another example, the mobile wallet application 126 is structured to allow the customer 106 to engage in transactions with a merchant point-of-sale device through NFC protocols and via the NFC circuit 128.

It should be understood, however, that the role the mobile wallet application 126 takes in payment transactions will depend on the implementation of the mobile wallet. For example, in a secure element framework, the mobile device 102 includes a secure element that is separate from the main system memory of the mobile device 102. The secure element includes any element having smart card functionalities, such as a universal subscriber identity circuit (a SIM card) or a secure digital card. In various arrangements, the secure element of the mobile device 102 includes a payment application that interfaces with the NFC circuit 128 of the mobile device 102 responsive to receiving a communication (e.g., an application protocol data unit) from the merchant point-of-sale device to enable payment information to be transferred (e.g., in the form of a payment token). By contrast, in a host card emulation ("HCE") framework, payment information is maintained within a cloud-based environment (e.g., a host emulation service or a mobile wallet database 140 of the mobile wallet computing system 108) rather than in the secure element. The cloud-based environment then provisions payment information (e.g., in the form of a payment token) onto the mobile wallet application 126 on the mobile device 102. The payment information is stored on the mobile device 102 for a limited time until it expires, after which new payment information is provisioned to the mobile device 102.

As discussed, the mobile wallet application 126 is structured to enable the customer 106 to register one or more payment vehicles, such as payment card 104, to the customer's 106 mobile wallet. In this regard, the mobile wallet application 126 is structured to present, control, and otherwise manage displays or graphical user interfaces on the mobile device 102 shown to the customer 106 by the display 124. In one embodiment, the mobile wallet application 126 presents the customer 106 with displays enabling the customer 106 to manually input information pertaining to the payment card 104. In another embodiment, the mobile wallet application 126 enables the customer 106 to take a picture of the payment card 104 with a camera functionality of the mobile device 102. The mobile wallet application 126 then processes the information input by the customer 106 (e.g., manually or with a picture), identifies account information, and transmits the information to the mobile wallet computing system 108 for storage (e.g., in the mobile wallet database 140 in association with the customer 106).

In various embodiments, once the payment card 104 is registered, the mobile wallet application 126 receives an inactive payment token (e.g., from the mobile wallet computing system 108 or the token service provider computing system 110) representing the payment card. Accordingly, the mobile wallet application 126 is configured to present displays that facilitate the customer 106 in activating the payment card 104 token on the mobile wallet. In one embodiment, the mobile wallet application 126 displays to the customer 106 an option for activating the registered payment card 104, such as by having a text message or an email with an activation code sent to the customer. The mobile wallet application 126 then displays a screen whereby the customer 106 can enter the activation code.

Figure 3:
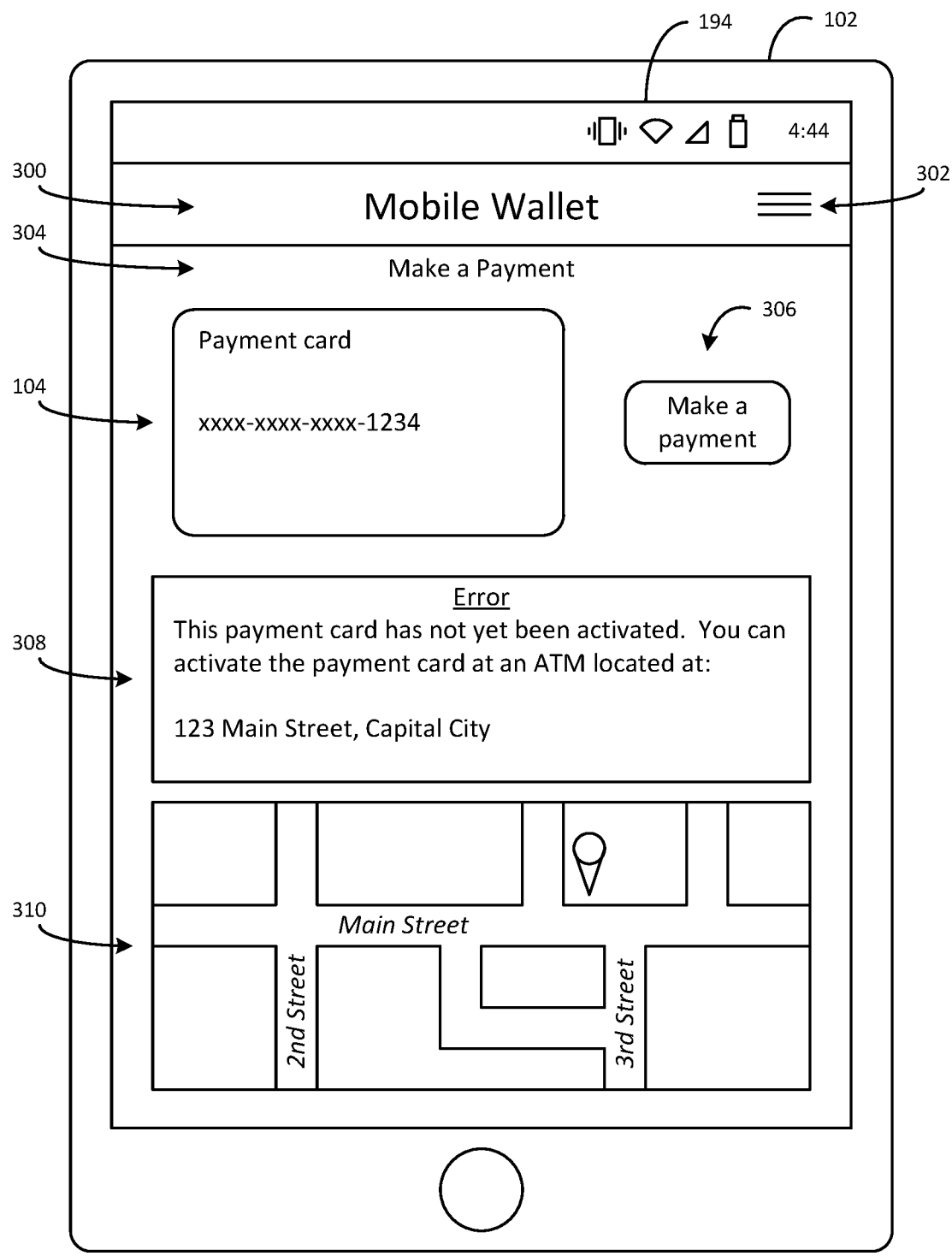
FIG. 3 is a graphical user interface shown, by a mobile device display, to a customer with an inactive payment token on the customer's mobile wallet.

Furthermore, in various arrangements, if the customer fails to activate the registered payment card 104, the mobile wallet application 126 is configured to present displays (e.g., alerts) notifying the customer 106 that the payment card 104 has not yet been activated for payment and instructing the customer 106 how to activate the payment card 104 (e.g., as shown in FIG. 3). In some arrangements, if the customer 106 fails to activate a payment token, the mobile wallet application 126 is also structured to determine when the mobile device 102 is within a certain distance of an ATM 114 capable of activating the token (e.g., by monitoring a location of the mobile device 102 using global positioning system ("GPS") functionalities of the mobile device 102), as discussed in further detail below, and notify the customer 106 accordingly, such as by displaying a pop-up notification on the mobile device 102.

The mobile wallet computing system 108 is associated with, owned by, and/or otherwise operated by a mobile wallet provider. In one embodiment, the mobile wallet provider is an issuer, such as the issuer of financial accounts associated with the issuer computing system 112. In another embodiment and as shown in FIG. 1, the mobile wallet provider is a third-party provider relative to the issuer that operates the issuer computing system 112.

As shown in FIG. 1, the mobile wallet computing system 108 includes a network interface 130 and a processing circuit 132. The network interface 130 is used to establish connections via the network 116 between the mobile wallet computing system 108 and other devices or computing systems in the system 100, such as the mobile device 102, the token service provider computing system 110, the issuer computing system 112, and/or the ATM 114. The network interface 130 further supports communication between the mobile wallet computing system 108 and other devices or computing systems in the system 100.

The processing circuit 132 includes a processor 134, a memory 136, and a mobile wallet circuit 138. Additionally, as shown in FIG. 1, the mobile wallet computing system 108 includes a mobile wallet database 140. The mobile wallet database 140 is structured to retrievably store information regarding mobile wallet accounts held by various users, including the mobile wallet account of the customer 106. For example, in one embodiment, the mobile wallet database 140 stores authentication information, payment vehicle information, and transaction histories for various mobile wallets. In various arrangements, the mobile wallet database 140 is structured as one or more remote data-storage facilities (e.g., cloud servers).

In some arrangements, the mobile wallet database 140 also includes a token vault that is maintained by the mobile wallet computing system 108. The token vault includes a lookup table maintaining tokens associated with various payment vehicles, such as the payment card 104. In some arrangements, the tokens stored therein are generated internally (e.g., at the mobile wallet computing system 108), while in other arrangements, the tokens are generated by other entities (e.g., by the token service provider computing system 110). In various embodiments, the token vault also includes information on whether each of the payment tokens is active, inactive, or expired. Additionally, in some embodiments, the mobile wallet database 140 includes an associated token management system including one or more algorithms, processes, formulas, etc. that facilitate the efficient searching of the information stored in the token vault.

The mobile wallet circuit 138 is structured to provide mobile wallet services for the user, including providing a mobile wallet on the mobile device 102. In some embodiments, the mobile wallet circuit 138 is structured to provide a mobile wallet client application (e.g., the mobile wallet application 126) on the mobile device 102. In this regard, the mobile wallet circuit 138 enables a user, such as the customer 106, to register for a mobile wallet account, presents the user with various user interfaces via the mobile wallet application 126 to manage the mobile wallet and register payment vehicles (e.g., payment card 104) to the mobile wallet, and enables the user to perform transactions using the mobile wallet.

In one embodiment, after the customer 106 initiates registration of the payment card 104 to the customer's 106 mobile account (e.g., by entering the PAN of the payment card 104, by taking a picture of the payment card 104) via the mobile wallet application 126, the mobile wallet circuit 138 receives the payment card 104 data from the mobile wallet application 126. In some arrangements, the mobile wallet circuit 138 generates a payment token for the payment card 104. In other arrangements, the mobile wallet circuit 138 communicates with the token service provider computing system 110 and/or the issuer computing system 112 to generate a payment token for the payment card 104. After the token is generated, the mobile wallet circuit 138 provisions the token in an inactive format on the mobile device 102 and stores the token in the mobile wallet database 140 as "inactive."

Additionally, the mobile wallet circuit 138 is structured to communicate with the issuer computing system 112 to activate the payment token for the payment card 104. In various arrangements, the mobile wallet circuit 138 sends instructions to the customer 106 (e.g., via a pop-up notification on the mobile wallet application 126, by sending a text to the mobile device 102, by sending the customer 106 an email) for activating the token of the payment card 104. As an example, the mobile wallet circuit 138 displays to the customer 106, via the mobile wallet application 126, a screen asking the customer 106 to select an activation method, including sending the customer 106 a text message with an activation code, sending the customer 106 an email with an activation code, and calling the customer 106. The mobile wallet circuit 138 then captures the customer's 106 activation method selection and provides the selection to the issuer computing system 112, which attempts to complete the activation process with the customer using the selected activation method.

If the issuer computing system 112 is successful in completing the activation process with the customer 106, the token is activated. For example, the mobile wallet circuit 138 changes the status of the token in the mobile wallet database 140 to "active." The customer 106 can then use the activated payment card 104 in the mobile wallet to make purchases via the mobile wallet (e.g., until the token expires, at which point a new token is provisioned onto the mobile device 102 at the first opportunity). However, if the issuer computing system 112 is not successful in completing the activation process with the customer 106 (e.g., the customer 106 does not complete the activation steps with the issuer computing system 112), the token remains inactive. Accordingly, the customer 106 cannot use the payment card 104 in the mobile wallet to make purchases through the mobile wallet application 126 and the mobile wallet circuit 138 until the token is activated.

As such, in various embodiments, the mobile wallet circuit 138 is further structured to communicate with the mobile device 102 and/or the ATM 114, via the network interface 130, to notify the customer 106 to finish activating a given payment vehicle on the customer's 106 mobile wallet. In one embodiment, when the customer 106 attempts to use a payment vehicle that has been provisioned to the customer's 106 mobile wallet to make a purchase, the mobile wallet circuit 138 verifies with the mobile wallet database 140 and/or with the token service provider computing system 110 whether the token for the payment vehicle is active, inactive, or expired. If the token is active, the mobile wallet circuit 138 processes the purchase payment. If the token is expired, the mobile wallet circuit 138 provisions a new token to the customer's 106 mobile wallet, if possible, or denies the transaction payment. If the token is inactive, the mobile wallet circuit 138 sends a notification to the customer 106 (e.g., via a pop-up notification on the mobile wallet application 126, by sending a text to the mobile device 102, by sending the customer 106 an email) indicating that the customer 106 needs to activate the payment vehicle in the mobile wallet before the payment vehicle can be used to make a purchase using the mobile wallet. In some arrangements, the mobile wallet circuit 138 provides the customer 106 with instructions on how to activate the payment vehicle, such as by directing the customer 106 to the nearest ATM where the customer can activate the payment vehicle (e.g., as shown in FIG. 3, as discussed below).

In another embodiment, when the customer uses a payment vehicle at the ATM 114 (e.g., to make a cash withdrawal), the ATM 114 sends a notification that the payment vehicle has been used to the mobile wallet circuit 138. The mobile wallet circuit 138 determines with the mobile wallet database 140 and/or the token service provider computing system 110 whether a token for the payment vehicle in the customer's 106 mobile wallet (or a token for another payment vehicle associated with the customer 106 in the customer's 106 mobile wallet) is active, inactive, or expired. If the token is inactive, the mobile wallet circuit 138 sends a notification to the user, either directly (e.g., via a pop-up notification on the mobile wallet application 126, by sending a text to the mobile device 102, by sending the customer 106 an email) or through the ATM 114, indicating that the customer 106 needs to activate the payment vehicle in the mobile wallet before the customer 106 can use the payment vehicle to make purchases via the mobile wallet.

The token service provider computing system 110 includes a computing system configured to create payment tokens representing payment vehicles and provision the payment tokens to mobile wallets held by various mobile wallet users, including the customer 106. In various embodiments, the token service provider computing system 110 is operated by a credit card network or other type of payment system, an acquiring or an issuing financial institution (e.g., the issuer associated with the issuer computing system 112), a merchant, a mobile wallet provider (e.g., mobile wallet computing system 108), and/or another provider. Accordingly, in some arrangements, the token service provider computing system 110 is a separate computing system, as shown in FIG. 1. In other arrangements, the token service provider is part of the mobile wallet computing system 108 and/or the issuer computing system 112.

As shown, the token service provider computing system 110 includes a network interface 150 and a processing circuit 152. The network interface 150 is used to establish connections via the network 116 between the token service provider computing system 110 and other devices or computing systems in the system 100, such as the mobile device 102, the mobile wallet computing system 108, the issuer computing system 112, and/or the ATM 114. The network interface 150 further supports communication between the token service provider computing system 110 and other devices or computing systems in the system 100.

The processing circuit 152 includes a processor 154, a memory 156, and a token generator circuit 158. Additionally, as shown in FIG. 1, the token service provider computing system 110 further includes a token database 160. The token database 160 is structured to retrievably store tokens generated by the token service provider computing system 110. In various embodiments, the token database 160 includes a token vault similar to the token vault included in various embodiments of the mobile wallet database 140, described above.

The token generator circuit 158 is configured to facilitate various services associated with payment tokens, including generating new tokens, authorizing tokens for use in a financial transaction, storing payment vehicle tokens (e.g., in the token database 160), and managing the life cycles of tokens. In one embodiment, the token generator circuit 158 creates a token representing a payment vehicle (e.g., a random number, a random set of alphanumeric characters, using a token generation algorithm) in response to a request from the mobile wallet computing system 108 or from the issuer computing system 112 for a token for a newly registered payment vehicle or to replace an expired token. After generating the payment token, the token generator circuit 158 then stores the token in the token database 160 and/or provides the token to the mobile wallet computing system 108 and/or the issuer computing system 112 for storage in a token vault. In another embodiment, the token generator circuit 158 manages expiration times for various tokens, after which the tokens are no longer valid, and downloads a new token to the mobile device 102 to replace an expired token.

The issuer computing system 112 is a computing system at an issuer that provides and maintains one or more financial accounts (e.g., a demand deposit account, credit or debit account, brokerage account) on behalf of various users, such as the customer 106. In some arrangements, the issuer is an issuer of a payment vehicle, such as payment card 104, held by the customer 106. In the context of the present disclosure, the issuer can include commercial or private banks, credit unions, investment brokerages, mobile wallet providers, and so on. The issuer can also include any commercial entity capable of maintaining payment vehicles on behalf of a user, including retailers, vendors, service providers, and the like. In some arrangements, the issuer is also a mobile wallet provider configured to manage mobile wallet accounts on behalf of its customers (e.g., customer 106), including authenticating mobile wallet transaction payments made from the customers' payment vehicles. For example, in certain embodiments, the issuer also operates the mobile wallet computing system 108 and/or the token service provider computing system 110.

As shown in FIG. 1, the issuer computing system 112 includes a network interface 170 and a processing circuit 172. The network interface 170 is used to establish connections via the network 116 between the issuer computing system 112 and other devices or computing systems in the system 100, such as the mobile device 102, the mobile wallet computing system 108, the token service provider computing system 110, and/or the ATM 114. The network interface 170 further supports communication between the issuer computing system 112 and other devices or computing systems in the system 100.

The processing circuit 172 includes a processor 174, a memory 176, and payment vehicle verification circuit 178. Additionally, as shown in FIG. 1, the issuer computing system 112 includes an accounts database 180. The accounts database 180 is structured to retrievably store information relating to accounts held by various customers (e.g., including customer 106) of the issuer associated with the computing system 112. In certain embodiments, the accounts database 180 further stores information relating to mobile wallet accounts of various customers. Accordingly, in various arrangements, the accounts database 180 includes personal information of customers (e.g., names, addresses, phone numbers), authentication information (e.g., username/password combinations, device authentication tokens, security question answers, unique customer identifiers, biometric data), and financial information (e.g., token information, account numbers, account balances, available credit, credit history, transaction histories) relating to the various customers of the issuer and their associated accounts. Furthermore, in certain arrangements, the accounts database 180 stores payment tokens associated with various payment vehicles (e.g., payment card 104) issued by the issuer of the issuer computing system 112. For example, the accounts database 180 stores the tokens in a token vault similar to the token vaults described above with respect to the mobile wallet database 140.

The payment vehicle verification circuit 178 is structured to verify information received from the customer 106 in the mobile wallet account registration process, as well as in the process of registering a payment vehicle the customer 106 holds through the issuer (e.g., payment card 104) to the mobile wallet computing system 108, as described above. Accordingly, in various embodiments, once a payment vehicle has been registered to a mobile wallet and an inactive token has been created for the payment vehicle, the payment vehicle verification circuit 178 obtains information that can be used to authenticate the customer 106, the mobile device 102, and/or the payment card 104. Once authenticated, the payment vehicle verification circuit 178 communicates with other devices and computing systems in the system 100 to activate the payment vehicle token. In one embodiment, the payment vehicle verification circuit 178 receives from the mobile wallet computing system 108 a selection made by the customer 106 of a method for payment vehicle activation. The payment vehicle verification circuit 178 then uses the selected method to authenticate the customer 106, the mobile device 102, and/or the payment card 104 and subsequently activate the token for the payment vehicle. In another embodiment, the payment vehicle verification circuit 178 communicates with the ATM 114 to activate the payment card 104, as discussed in further detail below.

The ATM 114 is configured to perform various banking services when a user (e.g., customer 106) inserts a bank card (e.g., a payment vehicle associated with an account held by the user at a bank) into the ATM 114. For example, in various embodiments, the ATM 114 is able to dispense cash withdrawn from the user's account, deposit checks into the user's account, allow the user to view account balances, and allow the user to view rewards points. Additionally, in some embodiments, the ATM 114 is configured to perform various banking services when a user (e.g., customer 106) transmits bank card information to the ATM 114 using the customer's 106 mobile wallet (e.g., via the NFC circuit 128 of the mobile device 102). In some arrangements, the ATM 114 is associated with a particular issuer, such as the issuer associated with the user's bank card and/or associated with the issuer computing system 112. In other arrangements, the ATM 114 is not associated with an issuer.

As shown in FIG. 1, the ATM 114 includes a network interface 190, an input/output circuit 192, a display 194, and a token activation circuit 196. The network interface 190 is used to establish connections via the network 116 between the ATM 114 and other devices or computing systems in the system 100, such as the mobile wallet computing system 108, the token service provider computing system 110, and/or the issuer computing system 112. The network interface 190 further supports communication between the ATM 114 and other devices or computing systems in the system 100.

The input/output circuit 192 is structured to receive communications from and provide communications to a user of the ATM 114 (e.g., customer 106). In this regard, the input/output circuit 192 is structured to exchange data, communications, instructions, etc. with an input/output component of the ATM 114. Accordingly, in one embodiment, the input/output circuit 192 includes an input/output device. In another embodiment, the input/output circuit 192 includes communication circuitry for facilitating the exchange of data, values, messages, and the like between an input/output device and the components of the ATM 114. In yet another embodiment, the input/output circuit 192 includes machine-readable media for facilitating the exchange of information between an input/output device and the components of the ATM 114. In still another embodiment, the input/output circuit 192 includes any combination of hardware components, communication circuitry, and machine-readable media.

As shown in FIG. 1, in various embodiments, the input/output circuit 192 includes an NFC circuit 198. The NFC circuit 198 is structured to enable the ATM 114 to communicate with other devices using near-field communication protocols. In some arrangements, the NFC circuit 198 includes an NFC chip and an associated controller (e.g., collectively an "NFC device") that configures the chip to exchange information with other devices equipped for NFC communication. As illustrated in FIG. 1, the ATM 114 is able to use the NFC circuit 128 to communicate with the mobile device 102 directly (e.g., without connecting to the network 116).

In various embodiments, the display 194 is a screen, a touchscreen, etc. In some arrangements, the ATM 114 uses the display 194 to communicate information to the user (e.g., customer 106), for example, by displaying information to the user on the display 194. In other arrangements, the ATM 114 additionally uses the display 194 to receive communications from the user, for example, through a keyboard provided on a touchscreen of the display 194. Accordingly, in certain arrangements, the display 194 is incorporated as an input/output device associated with the input/output circuit 192 (e.g., a touchscreen of the display 194 is incorporated as an input/output device associated with the input/output circuit 192).

The token activation circuit 196 is structured to coordinate with the mobile wallet computing system 108, the token service provider computing system 110, and/or the issuer computing system 112 to activate inactive mobile wallet payment tokens on user mobile devices (e.g., mobile device 102). Accordingly, as shown in FIG. 1, the token activation circuit 196 is structured to communicate with the mobile device 102 via NFC and communicate with the mobile wallet computing system 108, the token service provider computing system 110, and/or the issuer computing system 112 via the network 116 in activating a payment token. In one embodiment, the customer 106 indicates to the ATM 114 that the customer 106 wishes to activate a payment token representing the payment card 104 in the customer's 106 mobile wallet. In response to the customer 106 request to activate the payment token, the token activation circuit 196 asks (e.g., via the display 194) the customer to tap the mobile device 102 to an NFC mobile device reader (e.g., housing at least part of the NFC circuit 198) included in the ATM 114. The token activation circuit 196 then establishes an NFC communication session with the mobile device 102 using the NFC circuit 198.

Next, the token activation circuit 196 asks the customer 106 to enter authentication credentials for the payment card 104. For example, the token activation circuit 196 asks the customer 106 to enter a PIN for the payment card 104. As another example, the token activation circuit 196 asks the customer 106 to enter in personal information about the customer 106. The token activation circuit 196 verifies with the mobile wallet computing system 108 or the issuer computing system 112 that the authentication credentials are correct and, if the authentication credentials are correct, the mobile wallet computing system 108, the token service provider computing system 110, and/or the issuer computing system 112 activates the token. As an example, the token is updated to reflect "active" status in the mobile wallet database 140, the token database 160, and/or the accounts database 180. As another example, the token activation circuit 196 communicates to the mobile device 102 that the token is active, and the mobile wallet application 126 changes an internal designation of the token to "active." As a third example, a portion of the token indicating that the token is an inactive form of the token is updated to reflect that the token is active.

In certain embodiments, the token activation circuit 196 is further structured to notify the customer 106 when a payment token in the customer's 106 mobile wallet is inactive. In one embodiment, when the customer 106 uses the payment card 104 at the ATM 114, the token activation circuit 196 communicates with the mobile wallet computing system 108, the token service provider computing system 110, and/or the issuer computing system 112 to determine (a) if the customer 106 has a mobile wallet, (b) if the payment card 104 has been provisioned to the customer's 106 mobile wallet, and (c) if a payment token representing the payment card 104 is active. Additionally, in some arrangements, the token activation circuit 196 makes this same determination for one or more other payment cards held by the customer 106 (e.g., another payment card issued by the issuer but inactive within the customer's 106 mobile wallet). In another embodiment, the token activation circuit 196 determines if the customer 106 has an inactive payment token when the customer 106 is within a certain proximity to the ATM 114. For example, the token activation circuit 196 receives a notification from the mobile device 102 when the mobile device 102 is within a certain proximity to the ATM 114, and the token activation circuit 196 subsequently determines with the mobile wallet computing system 108, the token service provider computing system 110, and/or the issuer computing system 112 whether the customer 106 has an inactive payment token that can be activated at the ATM 114.

Once the token activation circuit 196 has determined that the customer 106 has a mobile wallet that the payment card 104 has been provisioned to, but that the payment token representing the payment card 104 is inactive, the token activation circuit 196 notifies the customer 106 that the payment token is inactive and asks the customer 106 if the customer 106 would like to activate the token through the ATM 114. As an example, the token activation circuit 196 displays a notification to the customer on the display 194, informing the customer 106 that the payment card 104 has not yet been activated and asking the customer 106 if the customer 106 would like to activate the token. As a second example, the token activation circuit 196 sends the notification to the mobile device 102, such as through a pop-up notification on the mobile wallet application 126 or through a text message.

Figure 2:
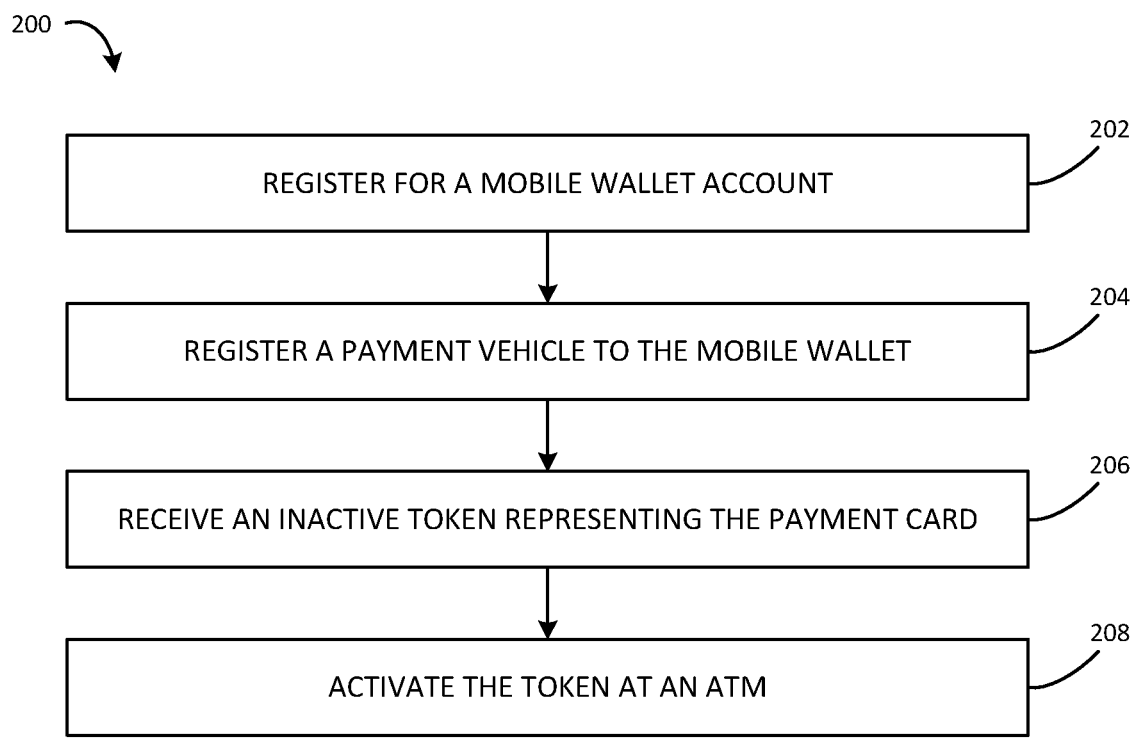
FIG. 2 is a flow diagram illustrating a method of activating a payment token by the system of FIG. 1, according to an example embodiment.

Referring now to FIG. 2, a flow diagram illustrating a method 200 of activating a payment token by the NFC token activation system 100 is shown, according to one embodiment. First, a mobile wallet account is registered for the customer 106 at 202. In various embodiments, the mobile wallet circuit 138 is structured to present the customer 106 with a plurality of registration interfaces (e.g., viewable by a web browser on the mobile device 102, viewable through the mobile wallet application 126 downloaded to the mobile device 102) prompting the customer 106 to input information, such as payment vehicle information (e.g., the PAN of the payment card 104), user identifying information, login credentials, and the like. The mobile wallet circuit 138 receives the registration information from the customer 106 (e.g., via the mobile device 102) and uses the registration information to create a mobile wallet account for the customer 106.

Subsequently, a payment vehicle is registered to the mobile wallet at 204. In various embodiments, the mobile wallet circuit 138 receives from the customer 106 (e.g., via the mobile wallet application 126 on the mobile device 102) information relating to a payment vehicle held by the customer 106, such as the payment card 104. For example, the customer 106 manually enters the PAN of the payment card 104 or takes a picture of the payment card 104 using the mobile wallet application 126 on the mobile device 102. The mobile wallet application 126 transmits the payment card 104 information to the mobile wallet circuit 138. The mobile wallet circuit 138 then communicates with the issuer computing system 112 associated with the payment card 104 to register the payment card 104 to the customer's 106 mobile wallet account. In various arrangements, before registering the payment card 104, the mobile wallet application 126 asks the customer 106 to enter in information verifying the payment card 104. For instance, the mobile wallet circuit 138 has the customer 106 enter a PIN or card security code ("CVC") associated with the payment card 104 into the mobile device 102, which the mobile wallet application 126 transmits to the mobile wallet circuit 138 and/or the payment vehicle verification circuit 178 for verification purposes.

Once the payment vehicle is registered, an inactive token representing the payment card 104 is received at 206. In some arrangements, once the payment card 104 is registered to the customer's 106 mobile wallet, the mobile wallet circuit 138 generates a payment token representing the payment card 104 (e.g., by running a token generation algorithm for the PAN of the payment vehicle, by randomly generating a number representing the payment card 104). In other arrangements, the mobile wallet circuit 138 communicates with the token service provider computing system 110, and the token generator circuit 158 generates the payment token representing the payment card 104. In still other arrangements, the issuer computing system 112 generates the payment token representing the payment card 104. Once generated, the payment token is stored in the mobile wallet database 140, the token database 160, and/or the accounts database 180. For example, the payment token is stored in a lookup table in association with the payment card 104 in the mobile wallet database 140, the token database 160, and/or the accounts database 180.

Subsequently, the mobile wallet computing system 108, the token service provider computing system 110, and/or the issuer computing system 112 provisions the payment token to the mobile device 102 in an inactive form. The mobile wallet circuit 138 then displays to the customer 106, via mobile wallet application 126, instructions for activating the token. In one embodiment, the mobile wallet computing system 108, the token service provider computing system 110, and/or the issuer computing system 112 indicates to the mobile wallet application 126 that the payment token is inactive at the time the payment token is provisioned to the mobile device 102. In that case, the mobile wallet application 126 will not allow the customer 106 to make purchases using the inactive payment token until the customer 106 activates the token. In another embodiment, the token is stored as inactive in the mobile wallet database 140, the token database 160, and/or the accounts database 180 until the customer 106 completes the activation process. Thus, if the mobile wallet computing system 108 receives any payment requests from the mobile device 102 using the inactive payment token, the mobile wallet computing system 108 will deny the request until the token is activated.

The token is activated using an ATM 114 at 208. In one embodiment, as described above, the mobile wallet application 126 notifies the customer 106 to activate the token at an ATM 114. In another embodiment, as also described above, the token activation circuit 196 of the ATM 114 notifies the customer 106 to activate the token at the ATM 114. The customer 106 then follows the directions provided by the ATM 114 for activating the payment token, and the token activation circuit 196 activates the token, as discussed above with respect to FIG. 1. Example directions provided by the ATM 114 for token activation are shown in FIGS. 4A-4D, as discussed in further detail below.

Referring now to FIG. 3, a graphical user interface displayed on the mobile device 102 is illustrated, according to an example embodiment. More specifically, FIG. 3 depicts an example screenshot observed by the customer 106 with an inactive payment token on a mobile wallet 300 of the mobile device 102. In the embodiment shown in FIG. 3, the mobile wallet 300 includes a menu button 302 that allows the customer 106 to navigate between different functionalities of the mobile wallet 300. Currently, the customer 106 is viewing a payment page 304. The payment page 304 shows that the customer 106 has provisioned payment card 104 to the mobile wallet 300 and includes a payment button 306 that the customer 106 can press to make a payment. However, the payment page 304 also includes an alert, shown as an error message box 308, notifying the customer 106 that the payment card 104 has not yet been activated for the mobile wallet 300. The error message box 308 further informs the customer 106 that the customer 106 can activate the payment card 104 at an ATM and provides the address of the ATM to the customer 106. The payment page 304 additionally includes a map 310 indicating the location of the ATM to the customer 106. In one embodiment, the error message box 308 is displayed in response to the customer 106 attempting to make a payment with the provisioned payment card 104 (e.g., using the payment button 306) while the token for the payment card 104 is inactive. In another embodiment, the error message box 308 is continuously displayed on the payment page 304 until the customer 106 activates the token associated with the payment card 104. However, those of skill in the art will appreciate that the payment page 304 is meant to be illustrative. Other embodiments of notifications or messages provided to a mobile wallet user by the system 100 and including activation instructions for a provisioned but inactive payment vehicle are appreciated by this application.

Figure 4A:
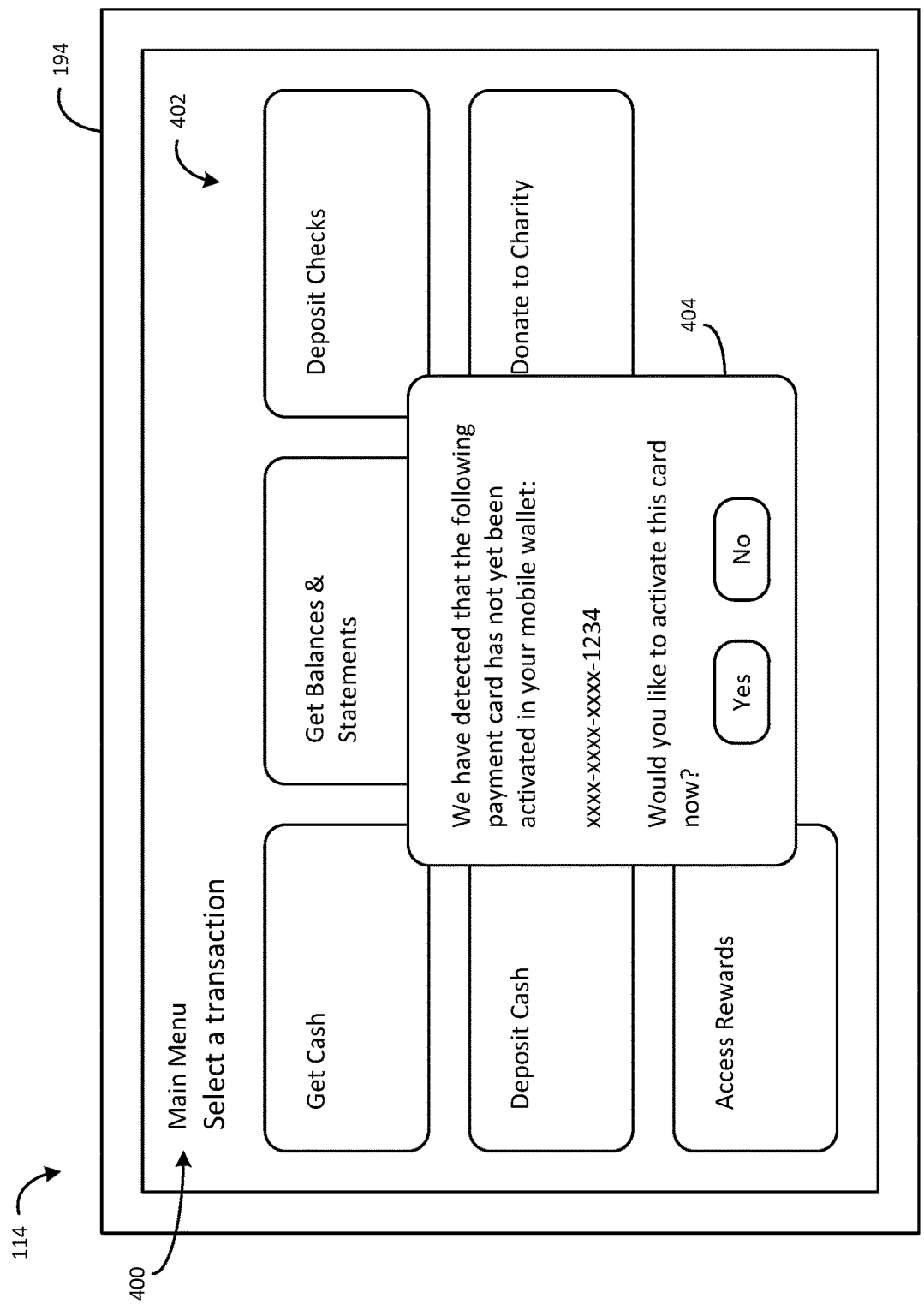
FIGS. 4A-4D are graphical user interfaces shown, by an automated teller machine display, to a customer as part of activating a payment token on the customer's mobile wallet.

Referring now to FIGS. 4A-4D, graphical user interfaces displayed on the ATM 114 are illustrated, according to example embodiments. More specifically, FIGS. 4A-4D depict example screenshots observed by the customer 106 on the display 194 of the ATM 114 during a process of activating an inactive payment token using the ATM 114. First, FIG. 4A shows a main menu screen 400 of the ATM 114, including a number of buttons 402 whereby the customer 106 can select a banking service to be performed at the ATM 114. FIG. 4A further shows a pop-up notification 404, indicating to the customer 106 that the customer 106 has a payment card that has not yet been activated in the customer's 106 mobile wallet. The pop-up notification 404 further asks the customer 106 if the customer 106 would like to activate this payment card.

Figure 4B:
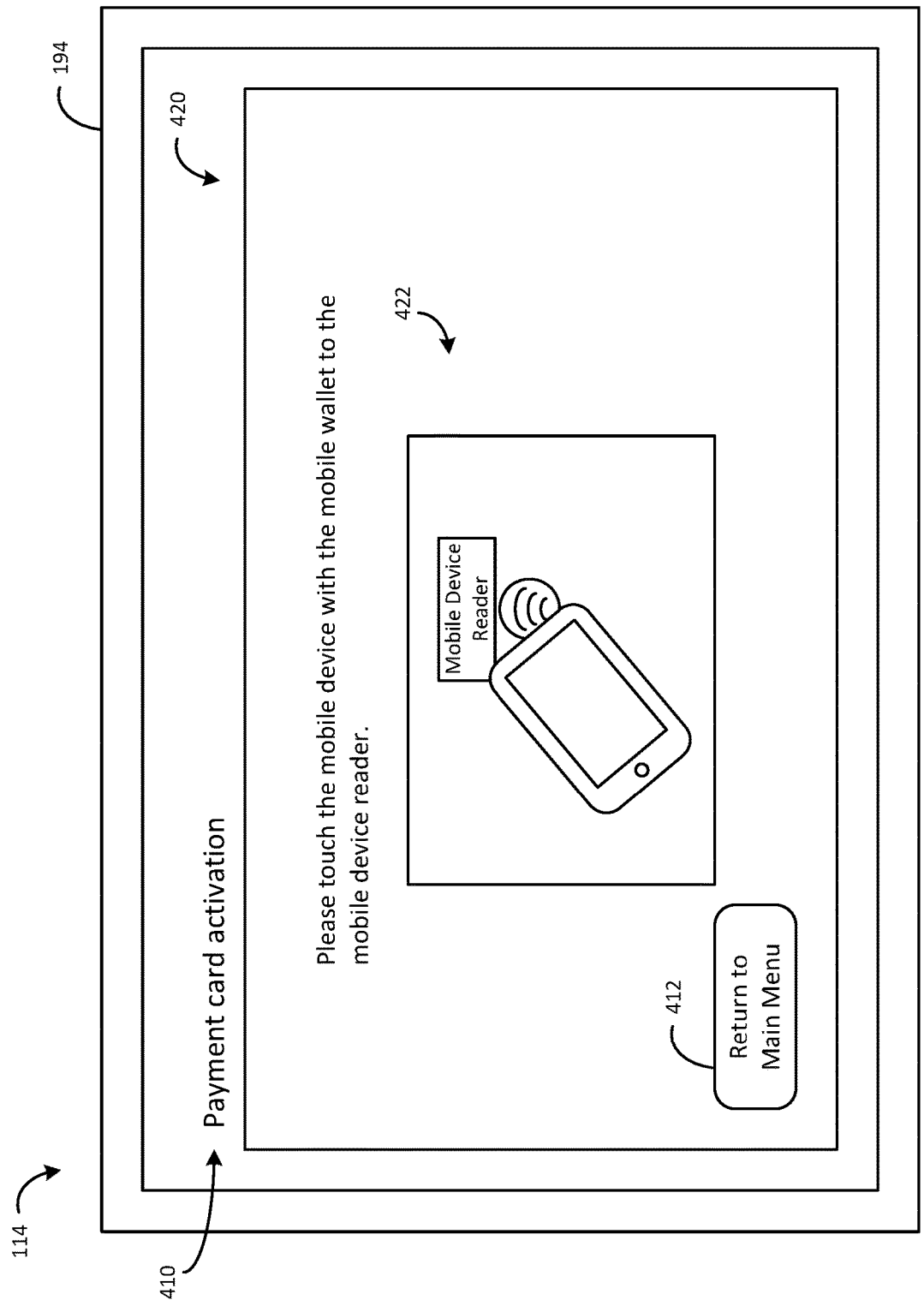
Figure 4C:
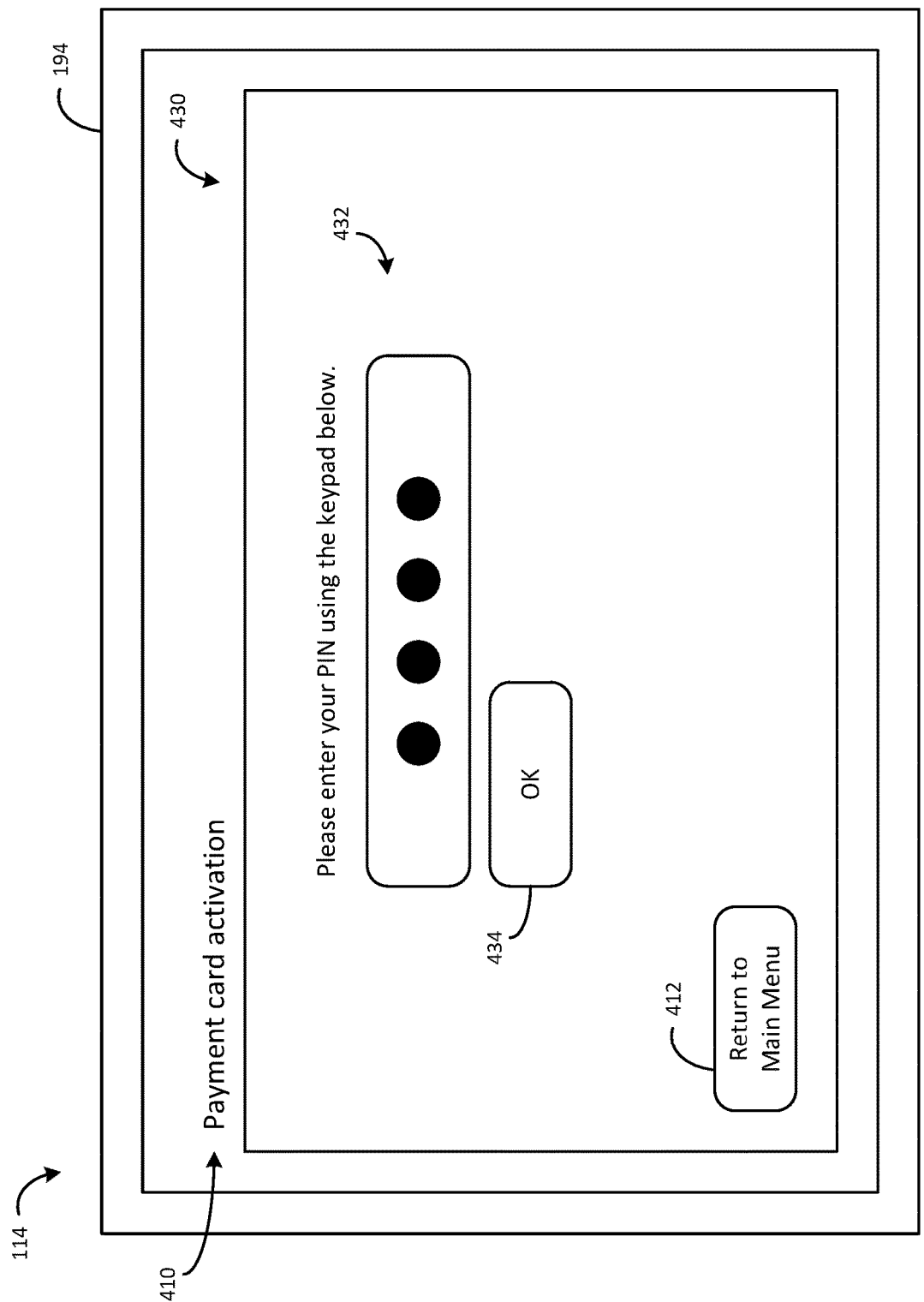
Figure 4D:
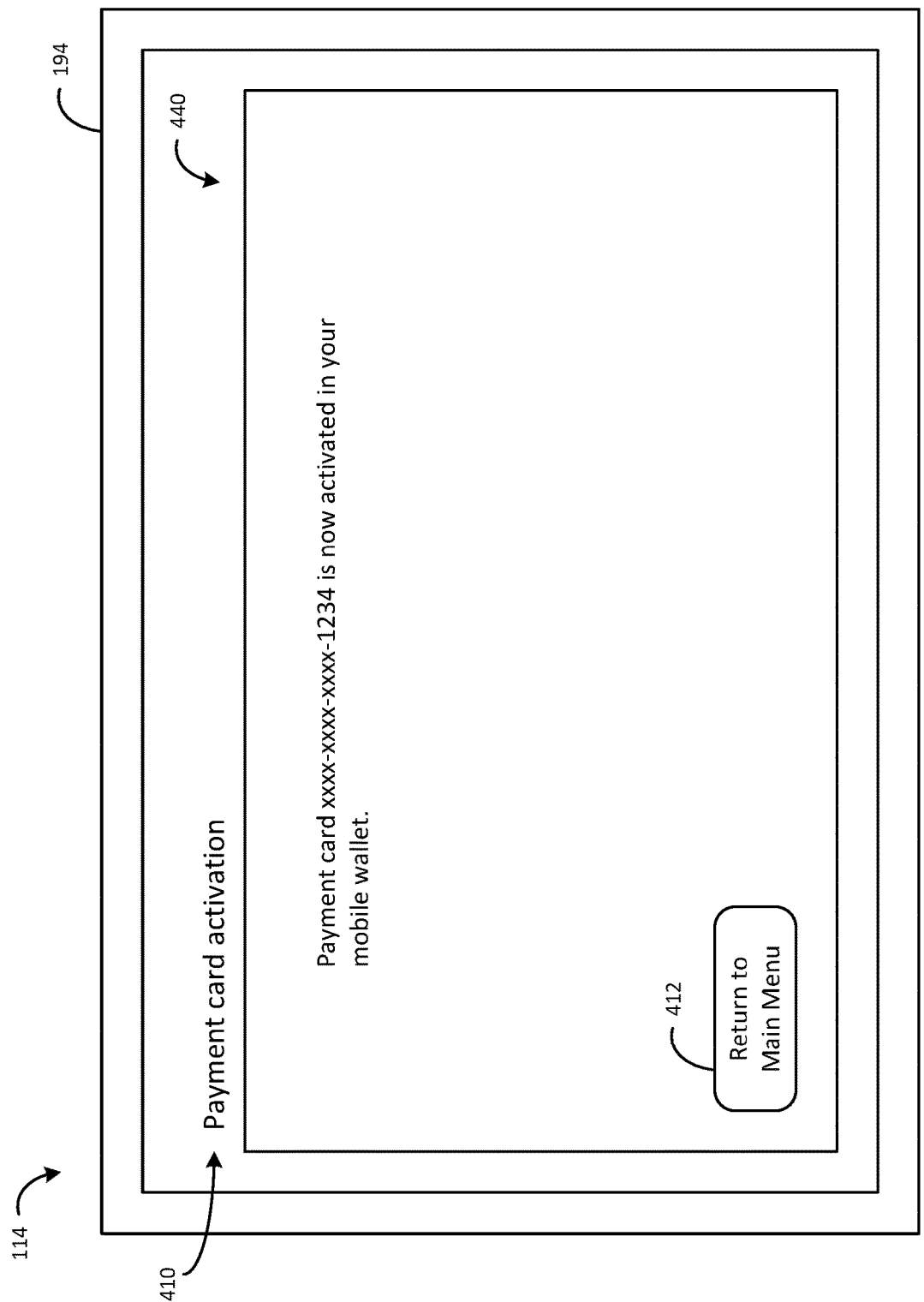

FIGS. 4B-4D depict a payment card activation screen 410 that the customer 106 is redirected to, for example, after pressing "yes" on the pop-up notification 404 shown in FIG. 4A. The payment card activation screen 410 includes a button 412 allowing the customer 106 to return to the main menu screen 400 at any time during the activation process. As shown in FIG. 4B, the payment card activation screen 410 first shows the customer 106 a connection instructions page 420, instructing the customer 106 to touch the mobile device 102 to a mobile device reader on the ATM 114 such that the ATM 114 can connect to the mobile device 102. For example, the mobile device reader includes at least a portion of the NFC circuit 198 that allows the ATM 114 to communicate with the mobile device 102 via NFC once the mobile device 102 is brought into proximity with the mobile device reader. The connection instructions page 420 includes a diagram 422 depicting a mobile device being brought into contact with the mobile device reader so that the customer 106 understands what the customer 106 is being asked to do.

After the customer 106 touches the mobile device 102 to the mobile device reader, the payment card activation screen 410 shows the customer a PIN instructions page 430, as illustrated in FIG. 4C. The PIN instructions page 430 instructs the customer 106 to enter a PIN associated with the payment card 104 using a keypad of the ATM 114. A PIN entry section 432 shows the customer 106 how many digits of the PIN the customer 106 has entered. The PIN instructions page 430 further includes a button 434 for the customer 106 to press once the customer 106 has entered the PIN.

After the customer 106 has entered the PIN and pressed the button 434, the ATM 114 communicates with the mobile device 102, via NFC, and the mobile wallet computing system 108, the token service provider computing system 110, and/or the issuer computing system 112, via the network 116, to activate the token. Once the token is activated, the payment card activation screen 410 shows the customer 106 an activation page 440, indicating that the payment card 104 has been successfully activated in the customer's 106 mobile wallet.

However, those of skill in the art will appreciate that FIGS. 4A-4D are meant to be illustrative, rather than limiting. For example, the pop-up notification 404 is merely an example notification displayed to the customer 106. In other embodiments, the customer 106 is shown a different notification or is notified that the customer 106 can activate a payment vehicle in a different manner (e.g., through a text message, through an email, through a notification on the mobile wallet application 126 of the mobile device 102). In still other embodiments, the customer 106 is not sent a notification and instead selects an option to activate a payment vehicle by pressing one of the buttons 402. Additionally, in various embodiments, different, fewer, or additional screens or pages are displayed to the customer 106 during the token activation process with the ATM 114.

The embodiments described herein have been described with reference to drawings. The drawings illustrate certain details of specific embodiments that implement the systems, methods and programs described herein. However, describing the embodiments with drawings should not be construed as imposing on the disclosure any limitations present in the drawings.

It should be understood that no claim element herein is to be construed under the provisions of 35 U.S.C. § 112 (f), unless the element is expressly recited using the phrase "means for."

As used herein, in various embodiments, the term "circuit" includes hardware structured to execute the functions described herein. In some embodiments, each respective "circuit" includes machine-readable media for configuring the hardware to execute the functions described herein. The circuit is embodied as one or more circuitry components including, but not limited to, processing circuitry, network interfaces, peripheral devices, input devices, output devices, sensors, etc. In some embodiments, a circuit takes the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" includes any type of component for accomplishing or facilitating achievement of the operations described herein. In one example, a circuit as described herein includes one or more transistors, logic gates (e.g., NAND, AND, NOR, OR, XOR, NOT, or XNOR), resistors, multiplexers, registers, capacitors, inductors, diodes, wiring, and so on.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, etc. In some embodiments, the one or more processors are external to the apparatus, for example, the one or more processors are a remote processor (e.g., a cloud based processor). Alternatively, or additionally, the one or more processors are internal and/or local to the apparatus. Accordingly, an exemplary system for implementing the overall system or portions of the embodiments might include a general purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), etc. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, etc. In some embodiments, the volatile storage media takes the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, a network interface includes cryptography capabilities to establish a secure or relatively secure communication session with other devices in communication with a device that the network interface is provided thereon. Thus, in these arrangements, personal information about the user of the device, financial data, and other types of data is encrypted and transmitted to prevent or substantially prevent the threat of hacking.

In certain embodiments, an "input/output device" as used herein includes hardware and associated logics configured to enable a party to exchange information with a computing device to which the input/output device is connected. In various embodiments, an input aspect of an input/output device allows a user to provide information to the computing device and includes, for example, a touchscreen, a mouse, a keypad, a camera, a scanner, a fingerprint scanner, an eye scanner, a sensor that detects movement, a microphone, a joystick, a user input device engageable to the computing device via a USB, wirelessly, and so on, or any other type of input device capable of being used with a computing device. In various embodiments, an output aspect of an input/output device allows a party to receive information from the computing device and includes, for example, a display, a printer, a speaker, illuminating icons, LEDs, an output device engageable to the computing device via a USB, wirelessly, and so on, or any other type of output device capable of being used with a computing device.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein show a specific order and composition of method steps, it is understood that in various embodiments the order of these steps differs from what is depicted. As an example, two or more steps are performed concurrently or with partial concurrence. Also, in various embodiments, some method steps that are performed as discrete steps are combined, steps being performed as a combined step are separated into discrete steps, the sequence of certain processes is reversed or otherwise varied, and/or the nature or number of discrete processes is altered or varied. Furthermore, the order or sequence of any element or apparatus is varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or as acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions can be made to the design, operating conditions and arrangement of the embodiments without departing from the scope of the present disclosure as expressed in the appended claims.

What is claimed is:
1. A mobile device comprising:
a near-field communication (NFC) device;
a network interface configured to communicate data via a network;
an input/output device configured to exchange data with a customer; and a processing circuit comprising a processor and a memory, the memory storing instructions that, when executed by the processor, cause the processing circuit to:
receive, via the input/output device, payment card information relating to a payment card of the customer;
transmit, via the network interface, the payment card information to a mobile wallet computing system;
receive, via the network interface, an inactive payment token representing the payment card;
store the inactive payment token in a mobile wallet of the mobile device;
transmit a proximity notification to an automated teller machine (ATM) when the mobile device is proximate the ATM;
receive a notification from the ATM prompting the customer to activate the inactive payment token via the ATM in response to the proximity notification and a determination by the ATM that the inactive payment token is inactive within the mobile wallet of the mobile device;
establish, via the NFC device, an NFC session with the ATM;
provide authentication information to the ATM;
receive an indication of a change in status of the inactive payment token to active from the ATM based on the customer being authenticated using the authentication information; and
update the status of the stored inactive payment token from inactive to active.

2. The mobile device of claim 1, wherein the instructions, when executed by the processor, further cause the processing circuit to:
in response to the status of the payment token being updated to active, display, by the input/output device, a notification to the customer indicating that the payment token has been activated.

3. The mobile device of claim 1, wherein the instructions, when executed by the processor, further cause the processing circuit to:
monitor a location of the mobile device using global positioning system (GPS) data; and
determine when the mobile device is within a certain distance of the ATM based on the GPS data.

4. The mobile device of claim 1, wherein the instructions, when executed by the processor, further cause the processing circuit to:
in response to the customer attempting to use the inactive payment token to make a payment, display, by the input/output device, an alert to the customer indicating that the inactive payment token needs to be activated.

5. The mobile device of claim 4, wherein the alert further includes a location of the ATM through which the customer can activate the inactive payment token.

6. The mobile device of claim 1, wherein the instructions, when executed by the processor, further cause the processing circuit to:
receive at least one authentication credential relating to the payment card; and
verify the at least one authentication credential.

7. The mobile device of claim 1, wherein the payment card is a debit card.

8. The mobile device of claim 1, wherein the payment card is a credit card.

9. A method comprising:
receiving, via an input/output device of a mobile device, payment card information relating to a payment card of a customer;
transmitting, via a network interface of the mobile device, the payment card information to a remote computing system;
receiving, via the network interface, an inactive payment token representing the payment card;
storing the inactive payment token in a mobile wallet of the mobile device;
transmitting, by the mobile device, a proximity notification to an automated teller machine (ATM) when the mobile device is proximate the ATM;
receiving, by the mobile device, a notification from the ATM prompting the customer to activate the inactive payment token via the ATM in response to the proximity notification and based on a determination by the ATM that the inactive payment token is inactive within the mobile wallet of the mobile device;
establishing, via a near-field communication (NFC) device of the mobile device, an NFC session with the ATM;
providing authentication information to the ATM;
receiving an indication of a change in status of the inactive payment token to active from the ATM based on the customer being authenticated using the authentication information; and
updating the status of the stored inactive payment token from inactive to active.

10. The method of claim 9, further comprising:
in response to the status of the payment token being updated to active, displaying, via the input/output device of the mobile device, a notification to the customer indicating that the payment token has been activated.

11. The method of claim 9, further comprising:
monitoring a location of the mobile device using global position system (GPS) data; and
determining when the mobile device is within a certain distance of the ATM based on the GPS data.

12. The method of claim 9, further comprising:
in response to the customer attempting to use the inactive payment token to make a payment, displaying, via the input/output device of the mobile device, an alert to the customer indicating that the inactive payment token needs to be activated.

13. The method of claim 12, wherein the alert further includes a location of the ATM through which the customer can activate the inactive payment token.

14. The method of claim 9, further comprising:
receiving at least one authentication credential relating to the payment card; and
verifying the at least one authentication credential.

15. The method of claim 9, wherein the payment card is a debit card.

16. The method of claim 9, wherein the payment card is a credit card.

* * * * *